United States Patent
Iizuka et al.

(10) Patent No.: US 8,376,866 B2
(45) Date of Patent: Feb. 19, 2013

(54) UNBALANCE CORRECTION DEVICE OF PROPELLER SHAFT

(75) Inventors: Shusuke Iizuka, Gunma-ken (JP); Manabu Watanabe, Gunma-ken (JP)

(73) Assignee: Yamada Manufacturing Co., Ltd., Kiryu-shi, Gunma-ken (JP)

( * ) Notice: Subject to any disclaimer, the term of this patent is extended or adjusted under 35 U.S.C. 154(b) by 118 days.

(21) Appl. No.: 12/923,449

(22) Filed: Sep. 22, 2010

(65) Prior Publication Data

US 2011/0077092 A1  Mar. 31, 2011

(30) Foreign Application Priority Data

Sep. 29, 2009  (JP) ................................. 2009-225614

(51) Int. Cl.
*F16D 3/76* (2006.01)
(52) U.S. Cl. .......................................... 464/91; 464/180
(58) Field of Classification Search .............. 464/89–91, 464/127, 180; 188/378
See application file for complete search history.

(56) References Cited

U.S. PATENT DOCUMENTS

| | | | | |
|---|---|---|---|---|
| 3,940,948 A | * | 3/1976 | Schultenkamper | 464/127 |
| 4,943,263 A | * | 7/1990 | Zyogahara et al. | 464/180 |
| 5,722,896 A | * | 3/1998 | Beagley et al. | 464/180 |
| 6,701,802 B2 | * | 3/2004 | Bogen | 464/180 X |

FOREIGN PATENT DOCUMENTS

| | | |
|---|---|---|
| JP | 55-61637 U | 4/1980 |
| JP | 5-94555 U | 12/1993 |

* cited by examiner

*Primary Examiner* — Gregory Binda
(74) *Attorney, Agent, or Firm* — McGinn IP Law Group, PLLC (57) ABSTRACT

An unbalance correction device of a propeller shaft includes a propeller shaft configured by a plurality of annular dampers being elastic members mounted along an axial direction between a metallic outer shaft and a metallic inner shaft and a balance weight in which a primary weight plate part and an auxiliary weight plate part that are formed in an arc along a width direction and include a substantially quadrilateral planar shape are formed continuously and integrally along a longitudinal direction, and a protruding piece is protrusively formed on a concave arced surface on a rear surface side of the primary weight plate part and from each corner part at four locations. The primary weight plate part is disposed in a non-mounted area of the dampers at an axial direction end of the outer shaft coinciding with an axial direction of the outer shaft.

10 Claims, 9 Drawing Sheets

Related Art

Fig.9B

Related Art

Fig.9C

Related Art

Fig.9D

Related Art

Fig.9F

Related Art

Fig.9E

Related Art

Fig.9G

Related Art

UNBALANCE CORRECTION DEVICE OF PROPELLER SHAFT

BACKGROUND OF THE INVENTION

1. Field of the Invention

The present invention relates to a device for correcting an unbalance of a propeller shaft for transmitting drive force to the rear wheel of a motorcycle; specifically, an unbalance correction device of a propeller shaft capable of securing a considerable amount of correction of unbalance of the shaft, reducing the generation of wind roar, air resistance, noise and the like while the motorcycle is running, and preventing the adverse effect of welding heat caused by welding and fixing the balance weight from exerting on a vibration absorbing rubber member.

2. Description of the Related Art

As the drive transmission system from the engine to the real wheel of a motorcycle (or a motorbike), generally speaking, there is a chain-based transmission system and a shaft-based transmission system. With the shaft-based transmission system, the rotation of the output axis of the engine is transmitted to the shaft, and the rotation of the shaft is transmitted to the rear wheel. This shaft is usually configured from an inner shaft and an outer shaft, and provided with components such as a universal coupling (joint). Moreover, a vibration absorbing elastic member is mounted between the outer shaft and the inner shaft.

As conventional technology, this kind of shaft is described in Japanese Utility Model Laid-open Publication No. H5-94555 and Japanese Utility Model Laid-open Publication No. S55-61637. The reference numerals are indicated in parentheses upon explaining Japanese Utility Model Laid-open Publication No. H5-94555 and Japanese Utility Model Laid-open Publication No. S55-61637 below. Japanese Utility Model Laid-open Publication No. H5-94555 relates to a truck and not a motorcycle, but discloses a propeller shaft for transmitting the rotary torque from the transmission to the rear axle. Incidentally, the reference numerals are indicated in parentheses upon explaining Japanese Utility Model Laid-open Publication No. H5-94555 below. Japanese Utility Model Laid-open Publication No. H5-94555 discloses a method of correcting the unbalance by welding a first balance piece (35) and a second balance piece (36) to the outer periphery surface of a pipe (24) and a yoke sleeve (23).

In Japanese Utility Model Laid-open Publication No. H5-94555, the first balance piece (35) and the second balance piece (36) are rectangular shaped steel plates, the yoke sleeve (23) is a cast structure, and the pipe (24) is made of iron. The first balance piece (35) and the second balance piece (36) are formed from a curved plate (37) and a protruding part (38) as shown in FIG. 3, and the protruding part (38) is welded thereto. This kind of propeller shaft, as described in Japanese Utility Model Laid-open Publication No. H5-94555, has the three main functions of "transmission of rotational torque," "absorption of position variation" and "blocking of rotational vibration."

In Japanese Utility Model Laid-open Publication No. H5-94555, the propeller shaft is configured from numerous components. Since there is variation in the precision of the individual components and variation in the subsequent assembly process, if the components are assembled as is, in most cases the weight distribution becomes uneven; that is, an unbalance occurs. Thus, in order for the propeller shaft rotating a high speed to sufficiently satisfy the foregoing three functions ("transmission of rotational torque," "absorption of position variation" and "blocking of rotational vibration"), it is important to correct the unbalance of the propeller shaft. Meanwhile, Japanese Utility Model Laid-open Publication No. H5-94555 welds the first balance piece (35) and the second balance piece (36), and much of the welding heat is transmitted from the balance pieces to the propeller shaft.

The propeller shaft is internally provided with a damper or the like made of rubber or other materials in order to achieve the blocking of rotational vibration among the foregoing three functions. Thus, there is a possibility that the function of the damper or the like may deteriorate due to the thermal stress of components of the propeller shaft or the hardening or rubber or other materials caused by the welded parts. In order to correct the unbalance of the propeller shaft, if the balance piece is welded and fixed, the components of the propeller shaft will be subject to thermal stress due to the welding heat, and new unbalance may arise in the propeller shaft. In order to overcome these various drawbacks, the location of welding the balance piece is limited to an extremely limited range at the end in the axial direction which is farthest from the damper or the like, and it is also necessary to reduce the welding amount as much as possible in order to reduce the welding heat.

Thus, in Japanese Utility Model Laid-open Publication No. H5-94555 also, only the protruding part (38) is welded as a small area at the end of the yoke sleeve (23). Nevertheless, as described above, since the range that the balance piece can be welded is limited to the end part in the axial direction, as shown in FIG. 3 of Japanese Utility Model Laid-open Publication No. H5-94555, if the balance piece is formed in a simple square shape, the size of the balance piece cannot be enlarged to be a given size or more, and there is a problem in that the amount of correction of the unbalance cannot be secured sufficiently. Specifically, if the balance piece is enlarged too much, the welding point of the balance piece will extend to the range where welding should not be performed; that is, to an area where the damper is mounted, and the damper will deteriorate due to the welding heat.

Figure 9A:
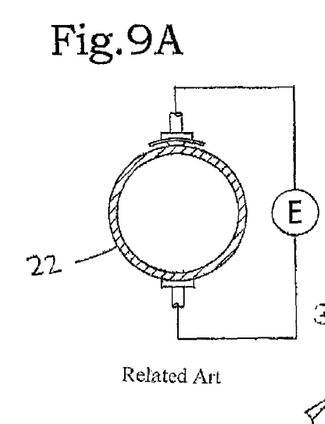
FIG. 9A is a longitudinal front view of the conventional technology.
Figure 9B:
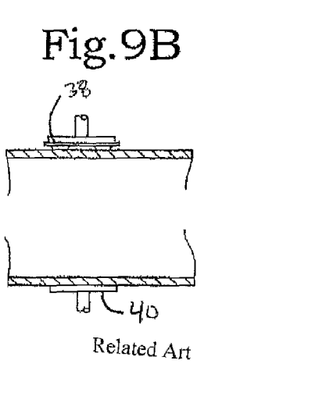
FIG. 9B is a longitudinal side view of the relevant part of the conventional technology.

Moreover, in Japanese Utility Model Laid-open Publication No. H5-94555, two protruding parts (38) are arranged and formed in a single line on the balance piece (35) along the longitudinal direction of the curved plate (37). In addition, a welding electrode is made to come in contact with the propeller shaft body (22) and the balance piece (35) by causing the longitudinal direction of the balance piece (35) to coincide with the axial direction of the propeller shaft body (22), and the protruding parts (38) are thereby welded to the propeller shaft body (22) (refer to FIG. 9A, FIG. 9B). Upon performing the welding, since the balance piece (35) is in contact with the protruding parts in a single line when viewed from the front in the axial direction of the propeller shaft body (22), the balance piece (35) is unable to obtain stability in the width direction.

Figure 9C:
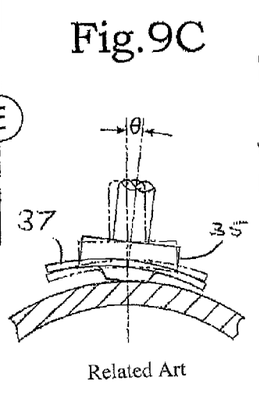
FIG. 9C is an enlarged front view of the relevant part showing a state where the balance piece is projection-welded in a fallen state in the conventional technology.

Accordingly, it is difficult to accurately fix the balance piece (35) to the propeller shaft body (22) in the width direction, and in certain cases, it is sufficiently possible that the balance piece (35) will fall and be fixed. For instance, FIG. 9C shows the balance piece (35) being fixed to the propeller shaft body (22) in its width direction in a state of falling (being tilted) at an angle θ upon performing the projection welding. If the propeller shaft body (22) to which the balance piece (35) is fixed in the foregoing manner is rotated, the following problems will arise.

Figure 9D:
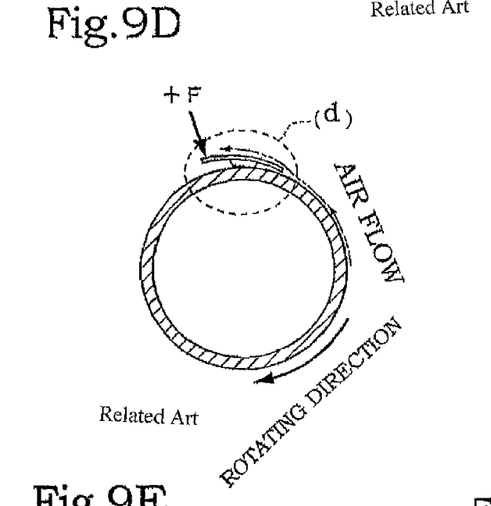
FIG. 9D is a longitudinal front view of a state where the balance piece has fallen toward the right side.

Foremost, let it be assumed that the propeller shaft body (22) rotates in a clockwise direction when viewed from the front in the axial direction. Meanwhile, the aerial flow of the circumferential direction of the axis will be generated in the opposite direction relative to the rotating direction of the propeller shaft body (22). If the curved plate (37) of the balance piece (35) falls to the right side relative to the perpendicular line passing through the diameter center when viewed from the front in the axial direction of the propeller shaft body (22), the aerial flow will pass above the curved plate (37) of the balance piece (35), and a load (+)F that yields pressed the surface of the left side of the curved plate (37) in the width direction toward the propeller shaft body (22) side will be applied (refer to FIG. 9D, FIG. 9E).

Figures 9E, 9G:
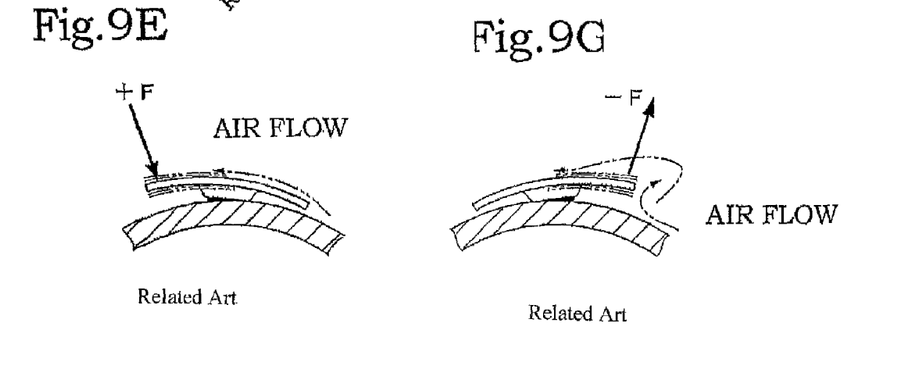
FIG. 9E is an enlarged view of section (d) of FIG. 9D.
FIG. 9G is an enlarged view of section (e) of FIG. 9F.
Figure 9F:
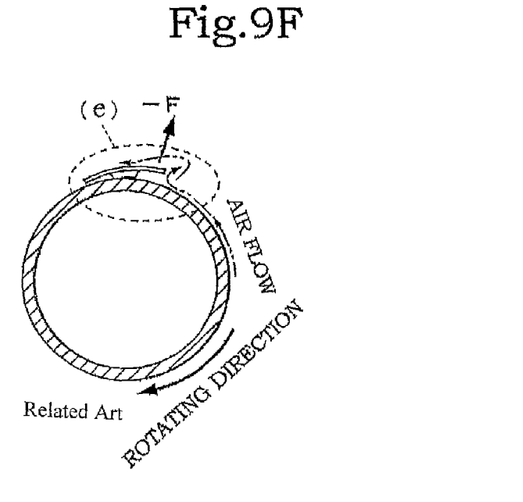
FIG. 9F is a longitudinal front view of a state where the balance piece has fallen toward the left side.

Moreover, contrarily, if the curved plate (37) of the balance piece (35) falls to the left side relative to the perpendicular line passing through the diameter center when viewed from the front in the axial direction of the propeller shaft body (22), the aerial flow will enter the back face on the right side of the curved plate (37) in the width direction and flow in a manner of colliding with the rear surface side of the curved plate (37), generate an air swirl, this becomes wind pressure resistance, and a load (−)F that attempts to peel the balance piece (35) from the propeller shaft body (22) is applied (refer to FIG. 9F, FIG. 9G).

Thus, with the balance piece (35), since the protruding parts (38) are formed in a single line along its longitudinal direction, and the column direction of the protruding parts (38) is along the axial direction of the propeller shaft body (22), regardless of whether the balance piece (35) falls toward the left or right when viewed from the front in the axial direction of the propeller shaft body (22), either the foregoing load (+)F or (−)F will be applied, and the balance piece (35) will be easily subject to rattling due to the vibration of the curved plate (37) since both ends of the curved plate (37) in the width direction are in a free state (refer to FIG. 9E, FIG. 9G).

Next, Japanese Utility Model Laid-open Publication No. S55-61637 discloses integrally forming, by bending, a protruding line (3c) protruding outward with an annular plate (3) in a propeller shaft, and fixing a balancing weight (4) to the protruding line (3c). Indeed, the amount of unbalance correction can be increased further by disposing the balancing weight (4) outward of the radial direction. However, generally speaking, the propeller shaft is disposed in the front and back directions in a substantially parallel manner relative to the traveling direction of the vehicle, and the propeller shaft rotates at high speed.

Thus, since the wind pressure will directly hit the balancing weight (4), there is a possibility that wind roars will occur or that the balancing weight (4) will become air resistance. In addition, if the balancing weight (4) is simply fixed to the tip of the protruding line (3c), since the tip side will be heavier, the balancing weight (4) will sway like a see-saw from the root of the protruding line (3c), and may become the source of generating noise. This is a phenomenon that occurs because the propeller shaft rotates at high speed and the wind pressure hits directly at a random size and direction. Moreover, since the rotating speed of the propeller shaft increases and decreases at random, the swaying of the balancing weight (4) will also be random.

SUMMARY OF THE INVENTION

Thus, an object (technical objective) of this invention is to secure a considerable amount of correction of unbalance of the shaft, reduce the generation of wind roar, air resistance, noise and the like while the motorcycle is running, and prevent the adverse effect of welding heat caused by welding and fixing the balance weight from exerting on a vibration absorbing rubber member upon correcting an unbalance of a propeller shaft for transmitting drive force to the rear wheel of a motorcycle.

Thus, as a result of intense study to overcome the foregoing problems, the present inventors resolved the foregoing problems by configuring a first exemplary embodiment of the invention as an unbalance correction device of a propeller shaft comprising a propeller shaft configured by a plurality of annular dampers being elastic members mounted along an axial direction between a metallic outer shaft and a metallic inner shaft, and a balance weight in which a primary weight plate part and an auxiliary weight plate part that are formed in an arc along a width direction and have a substantially quadrilateral planar shape are formed continuously and integrally along a longitudinal direction, and a protruding piece is protrusively formed on a concave arced surface on a rear surface side of the primary weight plate part and from each corner part at four locations, wherein the primary weight plate part is disposed in a non-mounted area of the dampers at an axial direction end of the outer shaft with a longitudinal direction of the balance weight coinciding with an axial direction of the outer shaft, and the balance weight is configured such that only the protruding piece comes in contact with and is welded to an outer peripheral side face of the outer shaft.

The present inventors additionally resolved the foregoing problems by configuring the invention of another exemplary embodiment as the unbalance correction device of a propeller shaft according to the first exemplary embodiment, wherein the auxiliary weight plate part has a width direction dimension that is smaller than the primary weight plate part. The present inventors additionally resolved the foregoing problems by configuring a third exemplary embodiment as the unbalance correction device of a propeller shaft according to the first and second exemplary embodiments of the invention, wherein the auxiliary weight plate part is formed such that the wall thickness thereof gradually becomes thinner as the auxiliary weight plate part becomes separated from an end of the primary weight plate part.

The present inventors additionally resolved the foregoing problems by configuring a fourth exemplary embodiment as the unbalance correction device of a propeller shaft according to any one of the first, second, or third exemplary embodiments, wherein a curvature radius of a rear surface side of the primary weight plate part is greater than a radius of the outer shaft, and the center of the curvature radius of the rear surface side of the primary weight plate part coincides with the center of the radius of the outer shaft in a state where the balance weight is disposed on the outer peripheral side face of the outer shaft. The present inventors additionally resolved the foregoing problems by configuring a fifth exemplary embodiment as the unbalance correction device of a propeller shaft according to any one of the first, second, third, or fourth exemplary embodiments, wherein a shape of a contact surface with the outer peripheral side face of the outer shaft in the protruding piece is a triangular shape.

In the first exemplary embodiment, as a result of a protruding piece being protrusively formed on a concave arced surface on a rear surface side of the weight plate part and from each corner part at four locations in the balance weight, the primary weight plate part of the balance weight will be in a four-point contact state relative to the outer peripheral side face of the outer shaft of the propeller shaft, and the balance weight can be installed in an extremely stable state on the propeller shaft, and in particular, upon performing projection welding, the balance weight can be fixed to the propeller shaft with projection welding extremely accurately due to the foregoing stability.

The area where the balance weight can be welded in the axial direction of the propeller shaft is limited to a range at an end of the axial direction to which an elastic member is not mounted. However, as a result of configuring the size of the primary weight plate part of the balance weight to be a width that will fit within an area to which the elastic member is not mounted, the protruding piece formed at the corner part of four locations of the primary weight plate part will be positioned with a non-mounted area. Accordingly, even if the protruding piece is projection-welded to the outer shaft of the propeller shaft, the welding heat will not reach the elastic member easily, and no adverse effect will be inflicted.

In addition, the weight of the balance weight can be sufficiently secured with the auxiliary weight plate part of the balance weight, and, since the auxiliary weight plate part is formed continuously and integrally with the primary weight plate part, it will not come in contact with the outer shaft at all and is not projection-welded with the outer shaft. Thus, even if the auxiliary weight plate part overlaps with the mounting area of the damper, the unbalance can be corrected without any welding heat being transmitted thereto. In the balance weight, as a result of preparing the auxiliary weight plate parts in various sizes as necessary, the unbalance can be corrected in an even broader range.

Since the axial direction of the shaft and the direction (alignment direction) in which the primary weight plate part and the auxiliary weight plate part of the balance weight are formed continuously coincide and the auxiliary weight plate part always fits in the axial direction, the wind pressure resistance during the rotating motion of the propeller shaft can be reduced. Similarly, when viewed from the front in a state where the propeller shaft is mounted on a motorcycle, the portions that will be subject to wind pressure are only the plate thickness portions of the primary weight plate part and the auxiliary weight plate part of the balance weight, and, therefore, the amount of air resistance caused by the balance weight can be minimized, and the wind roar in the traveling direction of the motorcycle will hardly occur.

As an exemplary aspect of the second exemplary embodiment, since the auxiliary weight plate part has a width direction dimension that is smaller than the primary weight plate part, the wind pressure resistance of the auxiliary weight plate part of the balance weight in the rotating direction of the propeller shaft can be reduced. In particular, since the auxiliary weight plate part will not protrude in the width direction relative to the primary weight plate part other than the plate thickness portion during the rotation of the propeller shaft, the auxiliary weight plate part will only be subject to air resistance for such plate thickness portion even when viewed from the front side in the axial direction of the propeller shaft. Accordingly, a phenomenon where the auxiliary weight plate part vibrates and makes noise due to the wind pressure from the front side in the axial direction of the propeller shaft will not occur easily.

With respect to the third exemplary embodiment, since the auxiliary weight plate part is formed such that the wall thickness thereof gradually becomes thinner as the auxiliary weight plate part becomes separated from an end of the primary weight plate part, the aerial flow is distributed to the front surface side and the rear surface side of the balance weight, and the flow of the wind will converge smoothly. It is thereby possible to reduce the wind roar even further. In addition, at the end of the auxiliary weight plate part, since the flow of the once distributed air converges smoothly and the air resistance can be reduced even further, it is possible to reduce the loss of the running energy of the motorcycle.

In addition, since the auxiliary weight plate part becomes thinner as it extends from the primary weight plate part to the tip part, the gap between the auxiliary weight plate part and the outer peripheral side face of the outer shaft becomes greater as it extends toward the tip of the auxiliary weight plate part. Thus, it becomes even more difficult for the auxiliary weight plate part and the outer shaft to come in contact during the projection welding, and it is possible to reliably perform projection welding only to the protruding piece of the primary weight plate part.

With respect to the fourth exemplary embodiment, the gap between the rear surface side of the primary weight plate part of the balance weight and the outer peripheral side face of the outer shaft of the propeller shaft will become equal (or even) at either position. Thus, the aerial flow in the circumferential direction of the axis when the propeller shaft rotates at high speed will flow regularly in a general laminar flow between the rear surface side of the primary weight plate part of the balance weight and the outer peripheral side face of the outer shaft, whereby turbulence and air resistance will not occur easily.

Moreover, since the balance weight is subject to plastic deformation so that the corner part at the four locations of the primary weight plate part protrudes toward the rear surface side in the process of being manufactured by press working, the protruding piece can be simultaneously formed, and the manufacturing efficiency can thereby be improved. In the fifth exemplary embodiment, since a shape of a contact surface with an outer peripheral side face of the outer shaft in the protruding piece is a triangular shape, the compatibility during the contact with the outer peripheral side face of the outer shaft of the propeller shaft becomes favorable.

DESCRIPTION OF THE PREFERRED EMBODIMENTS

Figure 1A:
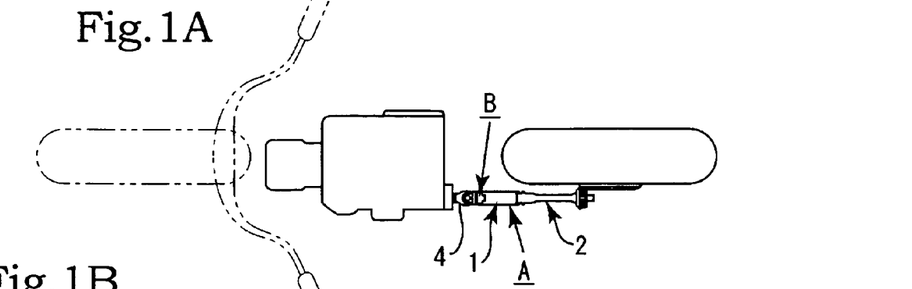
FIG. 1A is a schematic plan view of a state where the propeller shaft of the present invention is mounted on a motorcycle.
Figure 1B:
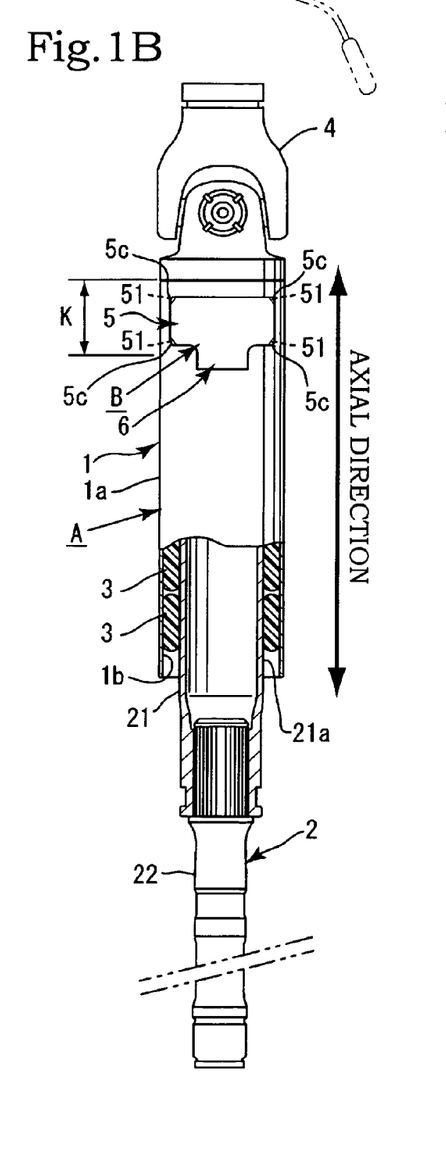
FIG. 1B is a plan view of a state where the outer shaft and the inner shaft are partially cut out.

The propeller shaft A of the present invention, as shown in FIG. 1A, is a component for transmitting the power transmitted from the engine to the rear wheel in a motorcycle via a transmission and a clutch. The propeller shaft A is disposed between the engine and the rear wheel, and arranged so that the traveling direction of the motorcycle and the axial direction of the propeller shaft A, or the axial direction of the propeller shaft A and the front/back direction of the motorcycle coincide. In other words, the propeller shaft A is disposed such that its axial direction is along the traveling direction of the motorcycle. The propeller shaft A is configured, as shown in FIG. 1B and FIG. 1C, mainly from an outer shaft 1, an inner shaft 2, a damper 3 and a yoke joint 4.

The outer shaft 1 and the inner shaft 2 are made of metal; specifically, made of an iron material. The outer shaft 1 is formed in a hollow shape, and the inner shaft 2 is housed in the outer shaft 1. The inner shaft 2 is configured from a housed axis part 21 and an output axis part 22, and the housed axis part 21 is housed inside the outer shaft 1. The output axis part 22 is an axis that is exposed to the outside. The output axis part 22 is actually formed to be longer than the outer shaft 1 in the axial direction (refer to FIG. 1A).

Figure 1C:
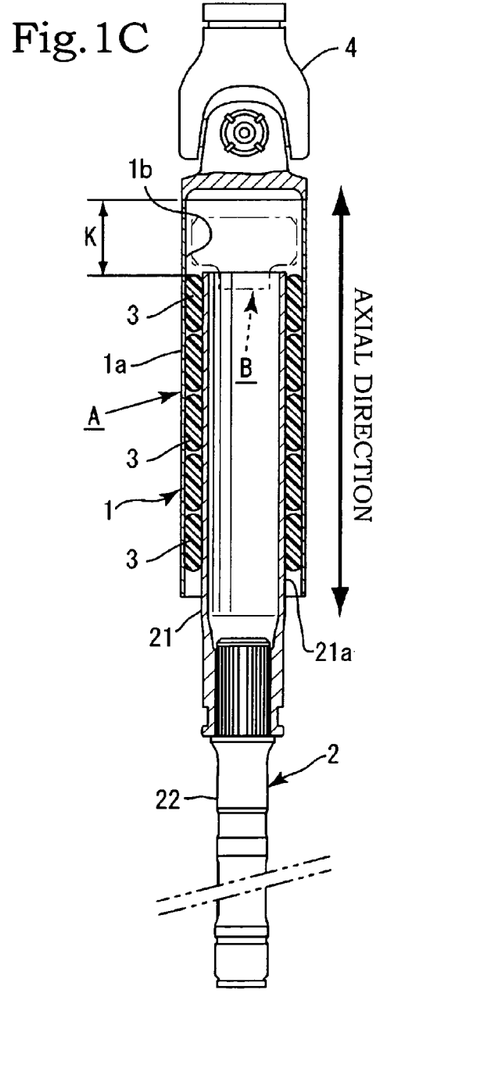
FIG. 1C is a cross sectional plan view of the outer shaft and the inner shaft.

As shown in FIG. 1C, a damper 3 is mounted between an inner peripheral side face 1b of the outer shaft 1 and an outer peripheral side face 21a of the housed axis part 21 of the inner shaft 2. The damper 3 is mounted by being lightly press-fitted and bonded to a gap between the outer peripheral side face 21a of the housed axis part 21 of the inner shaft 2 and the inner peripheral side face 1b of the outer shaft 1. The damper 3 is an elastic member formed in a general flat cylindrical annular (or ring) shape, and specifically a round rubber material is used.

The outer periphery side of the damper 3 is closely attached to the inner peripheral side face 1b of the outer shaft 1, and the inner periphery side of the damper 3 is closely attached to the outer peripheral side face 21a of the housed axis part 21 of the inner shaft 2. The housed axis part 21 of the inner shaft 2 transmits the rotary torque from the damper 3 to the output axis part 22. The damper 3 has a function of blocking the rotational vibration from the propeller shaft A, but the rotary torque is transmitted in its entirety. Specifically, the damper 3 and the housed axis part 21 of the inner shaft 2 housed on the inner periphery side of the outer shaft 1 rotate in synch at the same rotation speed.

With this structure, the damper 3 functions to solidly connect and fix the outer shaft 1 and the inner shaft 2, and reduce the vibration generated upon transmitting the rotation from the outer shaft 1 to the inner shaft 2 by absorbing such vibration. In the present invention, the dampers 3 are disposed in five columns along the axial direction of the outer shaft 1 and the inner shaft 2 (refer to FIG. 1C). A yoke joint 4 is mounted at the axial end part of the outer shaft 1 (refer to FIG. 1B, FIG. 1C). The yoke joint 4 is mounted at the front side end of the propeller shaft A in the axial direction, and receives the rotation from the engine (refer to FIG. 1A). The yoke joint 4 has the function of being able to transmit the rotary torque even if it is not aligned in a straight line along the axial direction of the propeller shaft A.

The balance weight B is now explained. The balance weight B corrects the unbalance of the propeller shaft A, and functions to ensure a favorable rotating motion without hardly any swaying (refer to FIG. 1B). The balance weights B are mounted on the propeller shaft A at two locations at most, but if the unbalance can be resolved by correcting the unbalance only by mounting the balance weight B at one location, then the balance weight B only needs to be mounted at one location.

Figure 2A:
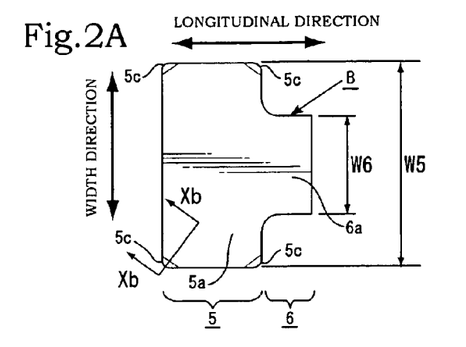
FIG. 2A is a plan view of the balance weight.

The balance weight B is formed by press working a plate-shaped steel material. The balance weight B is configured, as shown in FIG. 2A, FIG. 2C, FIG. 2D, FIG. 2F and the like, from a primary weight plate part 5 and an auxiliary weight plate part 6. The primary weight plate part 5 and the auxiliary weight plate part 6 are formed continuously and integrally in a single line as shown in FIG. 2A and FIG. 2C. The direction in which the primary weight plate part 5 and the auxiliary weight plate part 6 are formed in a line shall be the longitudinal direction of the balance weight B (refer to FIG. 2B, FIG. 2C).

Figure 2B:
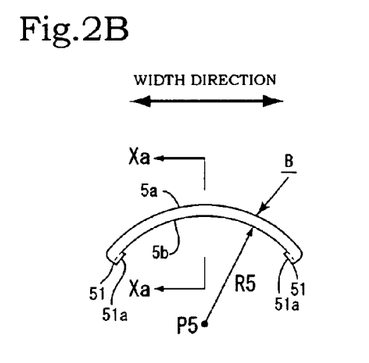
FIG. 2B is a front view of the balance weight.
Figure 2C:
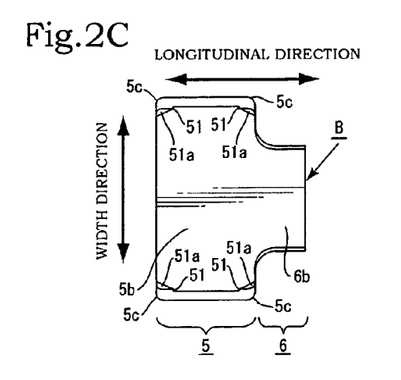
FIG. 2C is a rear view of the balance weight.

Moreover, with width direction of the balance weight B shall be a direction that is orthogonal to the foregoing longitudinal direction (refer to FIG. 2B, FIG. 2C). The primary weight plate part 5 is shaped by a plate material of a substantially quadrilateral shape such as a rectangle or a square being bent and formed in an arc. The primary weight plate part 5 is provided with a front surface side 5a and a rear surface side 5b, and the front surface side 5a is a convex surface and the rear surface side 5b is a concave surface (refer to FIG. 2B, FIG. 2D). Protruding pieces 51, 51, . . . are respectively formed at the each of the four corner parts 5c, 5c, . . . of the rear surface side 5b of the primary weight plate part 5 formed in a substantially quadrilateral shape (refer to FIG. 2B, FIG. 2C, FIG. 2D).

The corner parts 5c are external corner parts as shown in FIG. 2C, and become the four corners of the quadrilateral primary weight plate part 5. Specifically, the balance weight B is projection-welded with the four protruding pieces 51, 51, The balance weight B will be in a four-point contact state with the outer shaft 1 since the protruding pieces 51, 51, . . . are positioned at the ends of the primary weight plate part 5 in the width direction, and can be mounted stably on the outer peripheral side face 1a of the outer shaft 1, and can be fixed in an extremely stable manner in both the longitudinal direction (axial direction of the outer shaft 1) and the width direction (circumferential direction of the axis of the outer shaft 1) (refer to FIG. 3).

The protruding direction of the protruding piece 51 is a direction facing the center P5 of the curvature radius R5 of the rear surface side 5b of the primary weight plate part 5 (refer to FIG. 2B). However, the protruding direction of the protruding piece 51 may also be parallel from the corner parts 5c, 5c at both ends thereof in the width direction of the primary weight plate part 5. The protruding piece 51 is a part that comes in contact with the outer peripheral side face 1a of the outer shaft 1 of the propeller shaft A, and the shape of the contact surface 51a to come in contact with the outer peripheral side face 1a of the outer shaft 1 in the protruding piece 51 is a general triangular shape (refer to FIG. 2C, FIG. 2D, FIG. 2H, etc.).

Figure 7A:
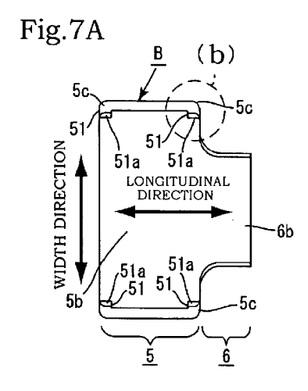
FIG. 7A is a rear view of a type in which the shape of the contact surface of the protruding piece is a substantially quadrilateral shape.
Figure 7B:
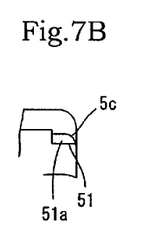
FIG. 7B is an enlarged view of section (b) of FIG. 7A.
Figures 7C, 7D:
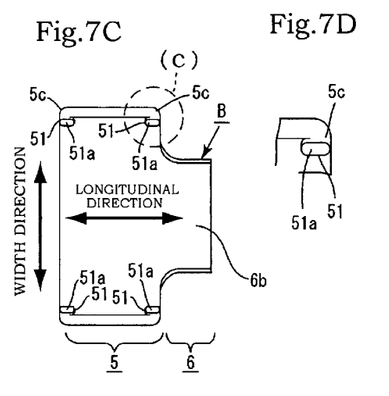
FIG. 7C is a rear view of a type in which the shape of the contact surface of the protruding piece is a general oval shape.
FIG. 7D is an enlarged view of section (c) of FIG. 7C.

Moreover, the contact surface 51a may also be formed in a substantially quadrilateral shape such as a rectangle or a square (refer to FIG. 7A, FIG. 7B), or formed in a circle or an oval shape (refer to FIG. 7C, FIG. 7D). The balance weight B is formed by press working as described above, but the protruding pieces 51 may also be formed by performing finish processing using the notch-shaped plastic deformation part formed at both ends of the arc-shaped primary weight plate part 5 in the width direction at the processing step of the press forming. In particular, if the notches that arise during the processing step of the press working of the primary weight plate part 5 of the balance weight B are used as is for forming the protruding pieces 51, the shape of the foregoing contact surface 51a can be made to be a general triangular shape.

The curvature radius R5 of the arc that is formed by bending the primary weight plate part 5 is made to be the same concentric circle as the diameter center position P1 in the diameter direction of the outer shaft 1 of the propeller shaft A. Specifically, the radius center P5 of the curvature radius R5 of the primary weight plate part 5 coincides with the position of the diameter center P1 of the outer shaft 1 (refer to FIG. 3B). In a state where the four protruding pieces 51, 51, . . . formed on the rear surface side 5b of the primary weight plate part 5 are in contact with the outer peripheral side face of the outer shaft 1 of the propeller shaft A, the spacing t of the gap between the rear surface side 5b of the primary weight plate part 5 and the outer peripheral side face 1a of the outer shaft 1 will be the same at either position.

The curvature radius R5 of the primary weight plate part 5 is formed to be slightly larger than the radius R1 of the outer shaft 1 of the propeller shaft A. For example, if the spacing between the rear surface side 5b of the primary weight plate part 5 and the outer peripheral side face 1a of the outer shaft 1 is 0.2 mm, it will be R5=R1+0.2. In other words, a spacing t of a narrow gap is formed between the balance weight B and the hollow shaft at the outer periphery side of the propeller shaft A.

Figure 5A:
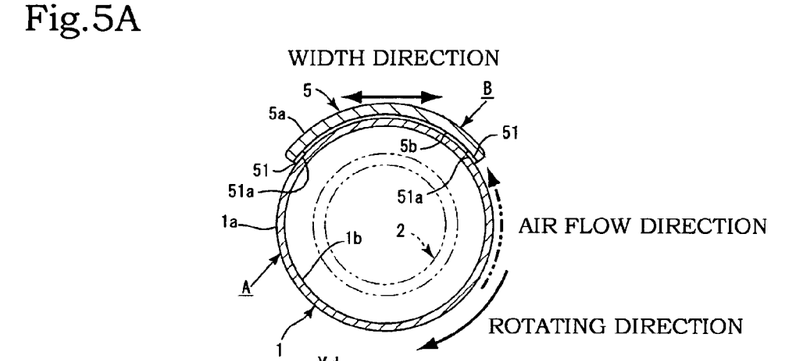
FIG. 5A is a front view showing the rotating direction in the rotating motion of the propeller shaft mounted with the balance weight and the flow direction of the aerial flow.
Figure 5B:
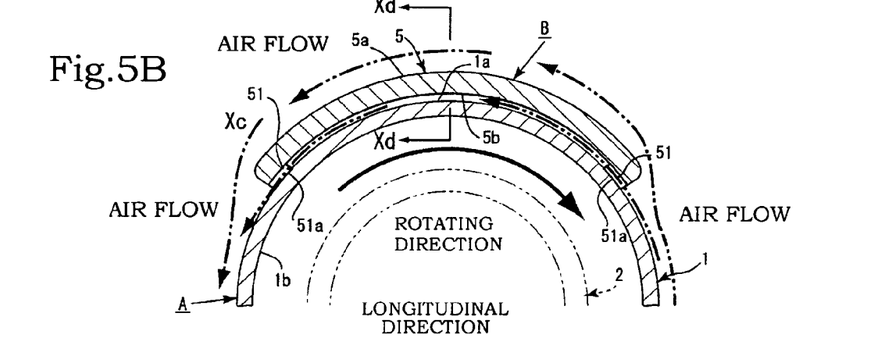
FIG. 5B is an enlarged view of the relevant part of FIG. 5A.

As described above, the gap t between the rear surface side 5b of the primary weight plate part 5 of the balance weight B and the outer peripheral side face 1a of the outer shaft 1 of the propeller shaft A will be the same (or even) at either position by causing the curvature radius R5 of the arc formed by bending the primary weight plate part 5 to be the concentric circle as the diameter center position P1 in the diameter direction of the outer shaft 1 of the propeller shaft A. Thus, when the propeller shaft A rotates at high speed in the circumferential direction of the axis, the aerial flow in the circumferential direction of the axis will be the opposite direction of the rotating direction of the propeller shaft A (refer to FIG. 5A), the aerial flow will flow regularly in a general laminar flow between the rear surface side 5b of the primary weight plate part 5 of the balance weight B and the outer peripheral side face 1a of the outer shaft 1. Thus, the air flowing in the gap and the air flowing on the surface of the balance weight B will smoothly converge when they are to converge once again, and it will be the most difficult for air resistance to occur (refer to FIG. 5B).

Figure 2D:
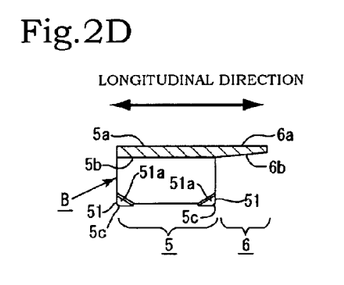
FIG. 2D is a cross section of arrow Xa-Xa of FIG. 2B.
Figures 2E, 2G, 2H:
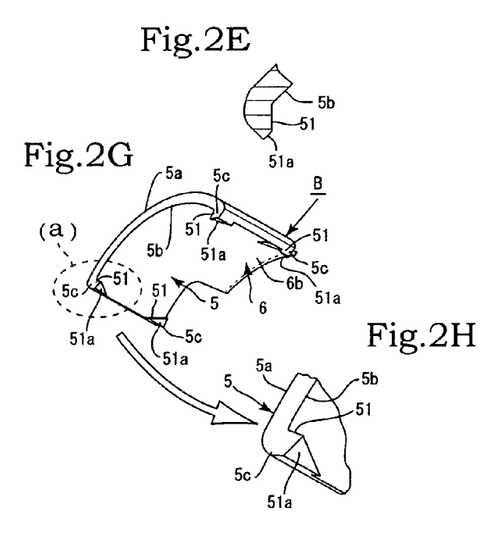
FIG. 2E is a cross section of arrow Xb-Xb of FIG. 2A.
FIG. 2G is a perspective view seen from the rear surface side of the balance weight.
FIG. 2H is an enlarged view of section (a) of FIG. 2G.
Figure 2F:
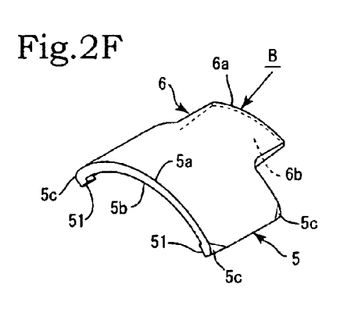
FIG. 2F is a perspective view of the balance weight.
Figure 8A:
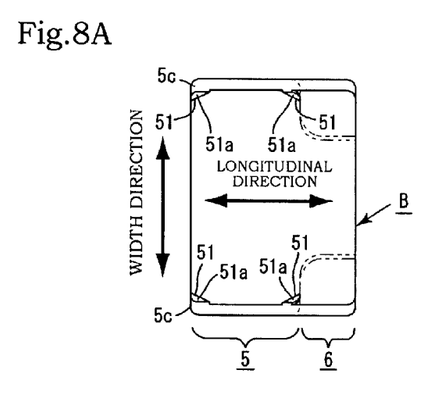
FIG. 8A is a rear view of a type in which the width direction dimension of the primary weight plate part and the width direction dimension of the auxiliary weight plate part are the same.

The auxiliary weight plate part 6 is configured integrally and continuously with the primary weight plate part 5 as shown in FIG. 2A, FIG. 2C, and FIG. 2D, and the width direction dimension W6 of the auxiliary weight plate part 6 is formed to be smaller than the width direction dimension W5 of the primary weight plate part 5 (refer to FIG. 2A). Moreover, the width direction dimension W5 of the primary weight plate part 5 and the width direction dimension W6 of the auxiliary weight plate part 6 may also be of the same dimension (refer to FIG. 8A). The auxiliary weight plate part 6 is formed in a quadrilateral shape such as a rectangle or a square, and is basically bent and formed in an arc in the width direction. The auxiliary weight plate part 6 is also provided with a front surface side 6a and a rear surface side 6b similar to the primary weight plate part 5.

Figures 3A, 3B, 3C:
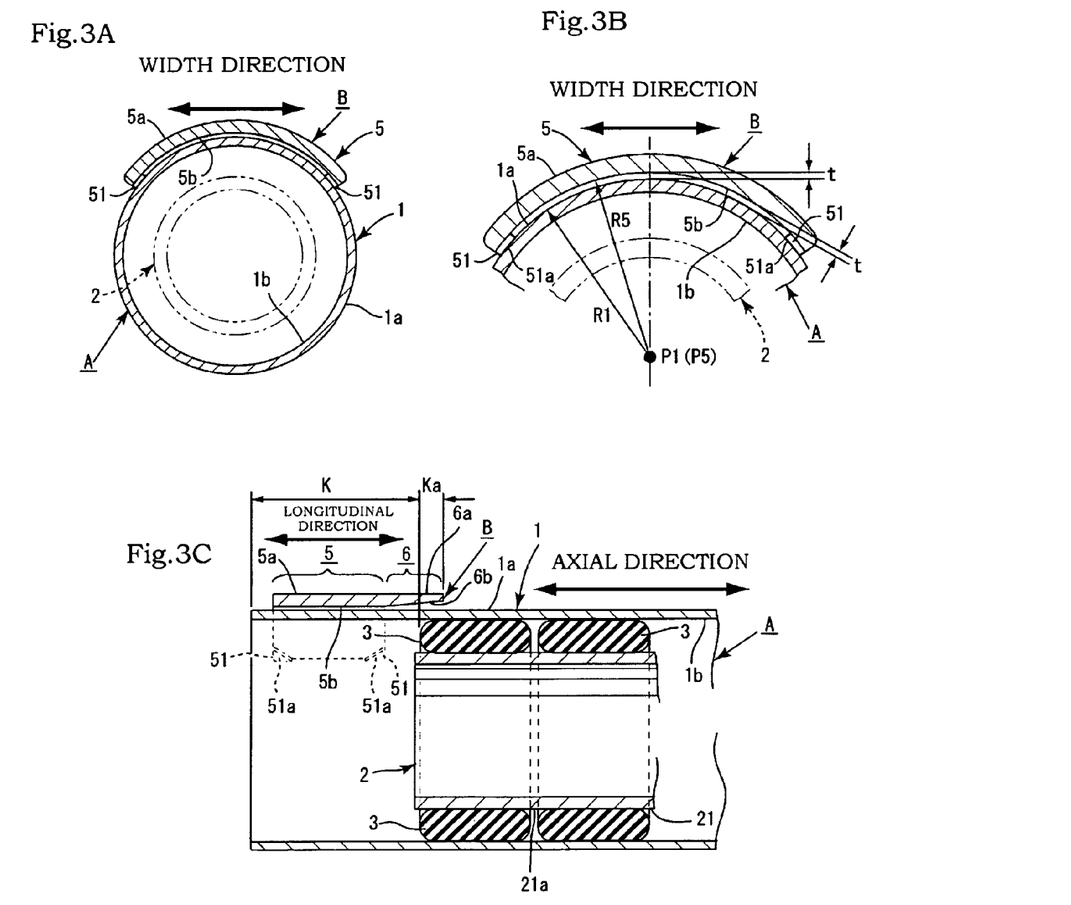
FIG. 3A is a longitudinal front view of a state where the balance weight is projection-welded to the outer shaft of the propeller shaft.
FIG. 3B is an enlarged view of the relevant part of FIG. 3A.
FIG. 3C is a longitudinal side view of the relevant part of a state where the balance weight is projection-welded to the outer shaft of the propeller shaft.
Figure 4A:
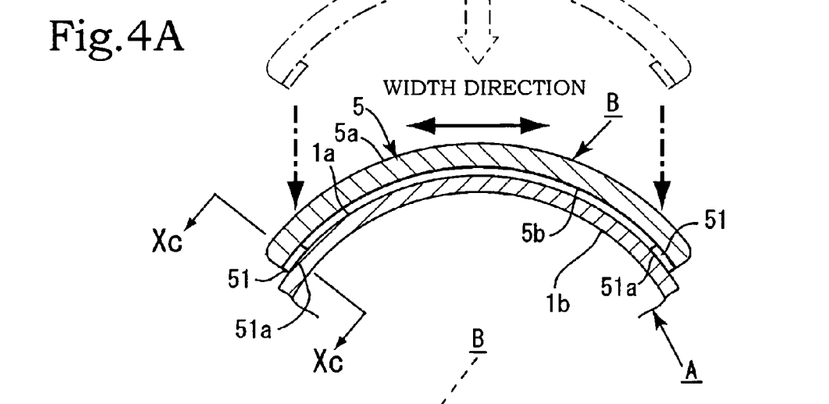
FIG. 4A is an enlarged cross section of the relevant part showing the mounted state of the outer shaft and the balance weight.
Figure 4B:
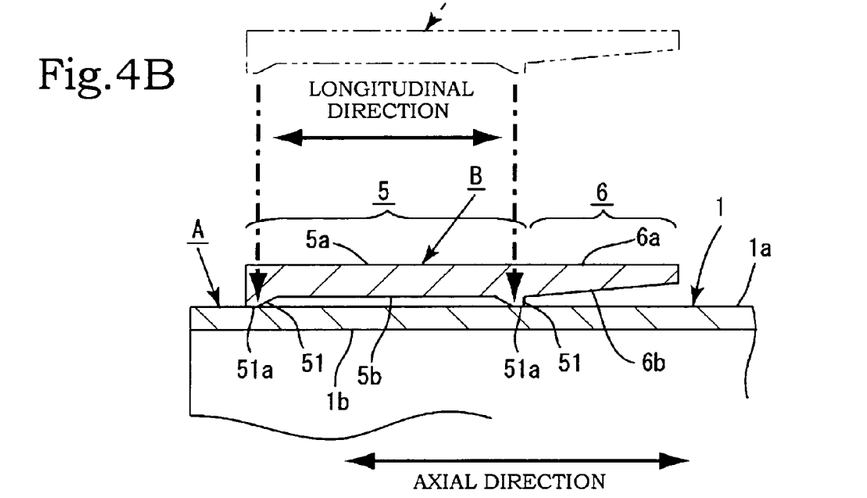
FIG. 4B is a cross section of arrow Xc-Xc of FIG. 4A.
Figure 8B:
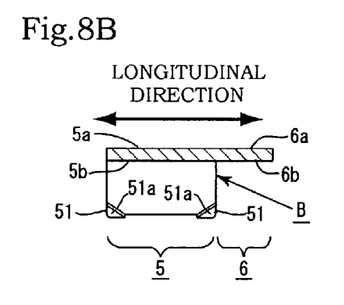
FIG. 8B is a longitudinal side view of the balance weight of a type in which the wall thickness of the auxiliary weight plate part is uniform, and a rear view of a type in which the shape of the contact surface of the protruding piece is a general triangular shape.

The auxiliary weight plate part 6 is formed such that the thickness gradually becomes thin from its root with the primary weight plate part 5 to the end across the axial direction as shown in FIG. 2D, FIG. 3C, FIG. 4B and the like. However, the front surface side 6a of the auxiliary weight plate part 6 is of the same plane with the front surface side 5a of the primary weight plate part 5, and the rear surface side 5b of the auxiliary weight plate part 6 is an inclined surface. Specifically, the plate thickness is 2.9 mm at the root with the primary weight plate part 5, and the plate thickness is thin at 2 mm at the tip part in the axial direction. Moreover, the wall thickness of the auxiliary weight plate part 6 may also be a uniform thickness at either position (refer to FIG. 8B).

Figure 5C:
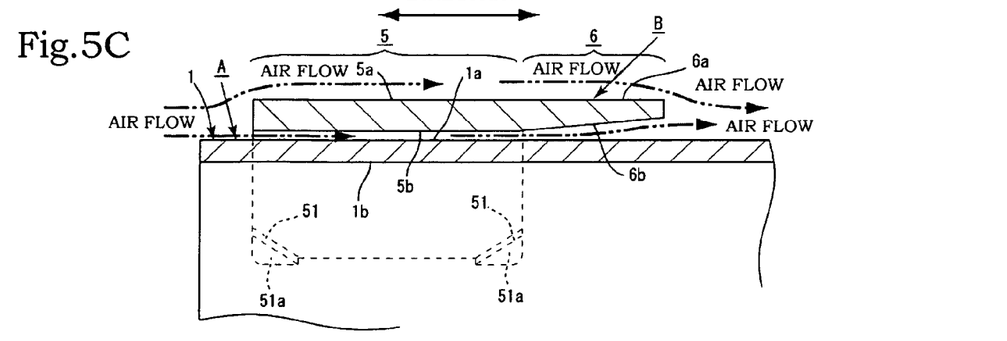
FIG. 5C is a cross section of arrow Xd-Xd of FIG. 5B.

Since the wall thickness of the auxiliary weight plate part 6 is formed to become gradually thinner as it becomes separated from the end of the primary weight plate part 5, the aerial flow is distributed to the front surface sides 5a, 6a and the rear surface sides 5b, 6b of the balance weight, and the aerial flow converges smoothly. Consequently, it is possible to further reduce the wind roar (refer to FIG. 5C). Moreover, since the auxiliary weight plate part 6 becomes thin as it extends from the primary weight plate part 5 to the tip part, the gap between the auxiliary weight plate part 6 and the outer peripheral side face 1a of the outer shaft 1 becomes greater as it extends toward the tip of the auxiliary weight plate part 6. Thus, during the projection welding, it becomes more difficult for the auxiliary weight plate part 6 and the outer peripheral side face 1a of the outer shaft 1 to come in contact, and it is possible to projection-weld only the protruding pieces 51 of the primary weight plate part 5 with accuracy.

Balance weights B of various weights may be prepared based on the different dimensions of the auxiliary weight plate part 6. Specifically, a plurality of different balance weights B in which the auxiliary weight plate part 6 of various sizes is prepared, and the balance weight B of the weight required for correcting the unbalance of the propeller shaft A is used.

Figure 6A:
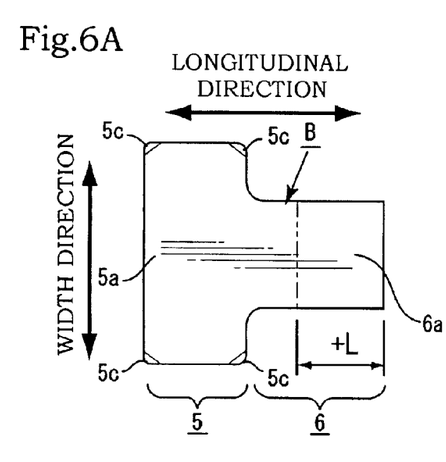
FIG. 6A is a plan view in which the dimension of the auxiliary weight plate part of the balance weight is increased.
Figure 6B:
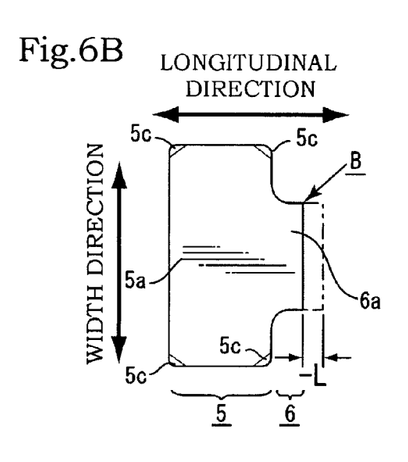
FIG. 6B is a plan view in which the dimension of the auxiliary weight plate part of the balance weight is decreased.

For example, a balance weight B that is heavier than the standard balance weight B can be obtained by making the length of the auxiliary weight plate part 6 in the longitudinal direction to be longer by ΔL relative to the balance weight B of a standard weight (refer to FIG. 6A), or a balance weight B that is lighter than the standard balance weight B can be obtained by making the length of the auxiliary weight plate part 6 in the longitudinal direction to be shorter by ΔL relative to the balance weight B of a standard weight (refer to FIG. 6B). By appropriately selecting the balance weight B among those with various weights, the unbalance of the propeller shaft A can be corrected with precision.

Figure 3D:
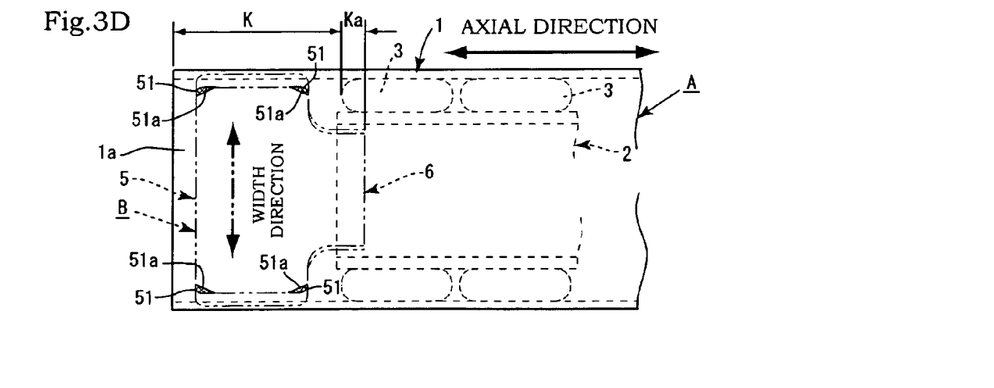
FIG. 3D is a plan view showing the contact state of the outer shaft and the protruding piece of the balance weight.

Upon fixing the balance weight B upon correcting the unbalance of the propeller shaft A, the longitudinal direction of the balance weight B is made to substantially coincide with the outer peripheral side face 1a of the outer shaft 1 configuring the propeller shaft A relative to the axial direction of the outer shaft 1 (refer to FIG. 1B, FIG. 3C, FIG. 3D). The primary weight plate part 5 is thereby disposed in the non-mounted area K of the damper 3 at the axial direction end of the outer shaft 1.

The non-mounted area K is the area of the outer peripheral side face 1a of the outer shaft 1 to which the damper 3 is not mounted internally at the axial direction end of the outer shaft 1 (refer to FIG. 1C, FIG. 3C, FIG. 3D). Moreover, the auxiliary weight plate part 6 of the balance weight B is set to be positioned at the center in the axial direction of the outer shaft 1 in comparison to the primary weight plate part 5 (refer to FIG. 1B, FIG. 3C, FIG. 3D). Specifically, the primary weight plate part 5 of the balance weight B is constantly positioned toward the outer side in the axial direction in a state of being fixed to the outer shaft 1.

The balance weight B and the outer peripheral side face 1a of the outer shaft 1 only come in contact at the four protruding pieces 51, 51, . . . , and the outer peripheral side face 1a of the outer shaft 1 and the rear surface side 5b of the primary weight plate part 5 and the rear surface side 6b of the auxiliary weight plate part 6 of the balance weight B are separated and in a non-contact state (refer to FIG. 3C, FIG. 3D). However, the auxiliary weight plate part 6 has an overlapping area Ka which positionally overlaps with the non-mounted area K. The overlapping area Ka is not in contact with the non-mounted area K on the peripheral side face 1a of the outer shaft 1 as described above.

Figure 4C:
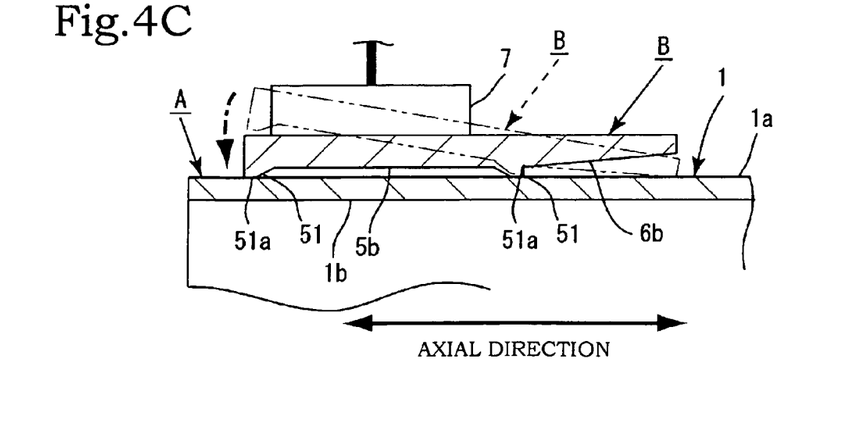
FIG. 4C is an enlarged cross section of the relevant part where the projection-welded electrode comes in contact with the balance weight.

The balance weight B comes in contact with the four protruding piece 51, 51, . . . relative to the outer shaft 1 of the propeller shaft A, and is welded at the welding points of the protruding piece 51, 51, . . . and the outer peripheral side face 1a of the outer shaft 1. Projection welding is used as the welding means. The balance weight B in this invention is especially favorable for projection welding, and the four protruding pieces 51, 51, . . . formed on the primary weight plate part 5 of the balance weight B are arranged in a quadrilateral shape. Thus, the four protruding pieces 51, 51, . . . become a four-point contact with the outer peripheral side face 1a of the outer shaft 1 configuring the propeller shaft A (refer to FIG. 3D), and the balance weight B can be projection-welded in a stable state without swaying in the width direction and longitudinal direction upon causing the electrode 7 to be projected welded to come in contact with the balance weight B and the outer peripheral side face 1a of the outer shaft 1 (refer to FIG. 4).

In a state where the balance weight B is fixed to the propeller shaft A, although it appears that a thin arc plate is in general contact with the outer peripheral side face 1a of the outer shaft 1, in reality there is a slight gap t between the outer peripheral side face 1a of the outer shaft 1 and the rear surface side 5b of the primary weight plate part 5 and the rear surface side 6b of the auxiliary weight plate part 6 (refer to FIG. 3B). The welding range to the propeller shaft A of the balance weight B will be the non-mounted area K without the damper 3 in the outer shaft 1.

Measurement of the unbalance amount of the propeller shaft A is performed in a state when the propeller shaft A has been assembled by giving consideration to the total (overall) variation in the precision of the respective components and variation in the precision of assembly. Then, the unbalance amount (g·Cm) (N·m if in S1 units) is measures while rotating the propeller shaft at a given rotation speed (pm), and a balance weight B is selected and welded among those of various weights based on the measurement result. Consequently, the unbalance amount of the overall propeller shaft can be reduced and the swaying during the rotation can be decreased.

What is claimed is:

1. An unbalance correction device of a propeller shaft, comprising:
    a propeller shaft comprising a plurality of annular dampers each comprising elastic members mounted along an axial direction between a metallic outer shaft and a metallic inner shaft; and
    a balance weight comprising a primary weight plate part and an auxiliary weight plate part that are formed in an arc shape along a width direction and comprising a substantially quadrilateral planar shape that are formed continuously and integrally along a longitudinal direction, and a protruding piece is protrusively formed on a concave arced surface on a rear surface side of the primary weight plate part and from each corner part at four locations,
    wherein the primary weight plate part is disposed in a non-mounted area of the plurality of annular dampers at an axial direction end of the outer shaft with a longitudinal direction of the balance weight coinciding with an axial direction of the outer shaft, and the balance weight is configured such that only the protruding piece comes in contact with and is welded to an outer peripheral side face of the outer shaft, and
    wherein a curvature radius of a rear surface side of the primary weight plate part is greater than a radius of the outer shaft, and a center of the curvature radius of the rear surface side of the primary weight plate part coincides with a center of a radius of the outer shaft in a state where the balance weight is disposed on the outer peripheral side face of the outer shaft.

2. The unbalance correction device of a propeller shaft according to claim 1, wherein the auxiliary weight plate part has a width direction dimension that is less than a width direction dimension of the primary weight plate part.

3. The unbalance correction device of a propeller shaft according to claim 2, wherein the auxiliary weight plate part is formed such that a wall thickness thereof gradually becomes thinner as the auxiliary weight plate part becomes separated from an end of the primary weight plate part.

4. The unbalance correction device of a propeller shaft according to claim 1, wherein the auxiliary weight plate part is formed such that a wall thickness thereof gradually becomes thinner as the auxiliary weight plate part becomes separated from an end of the primary weight plate part.

5. The unbalance correction device of a propeller shaft according to claim 4, wherein a shape of a contact surface with the outer peripheral side face of the outer shaft in the protruding piece comprises a triangular shape.

6. The unbalance correction device of a propeller shaft according to claim 1, wherein a shape of a contact surface with the outer peripheral side face of the outer shaft in the protruding piece comprises a triangular shape.

7. An unbalance correction device of a propeller shaft, comprising:

a propeller shaft comprising a plurality of annular dampers each comprising elastic members mounted along an axial direction between a metallic outer shaft and a metallic inner shaft; and a balance weight comprising a primary weight plate part and an auxiliary weight plate part that are formed in an arc shape along a width direction and comprising a substantially quadrilateral planar shape that are formed continuously and integrally along a longitudinal direction, and a protruding piece is protrusively formed on a concave arced surface on a rear surface side of the primary weight plate part and from each corner part at four locations, wherein the primary weight plate part is disposed in a non-mounted area of the plurality of annular dampers at an axial direction end of the outer shaft with a longitudinal direction of the balance weight coinciding with an axial direction of the outer shaft, and the balance weight is configured such that only the protruding piece comes in contact with and is welded to an outer peripheral side face of the outer shaft, wherein the auxiliary weight plate part has a width direction dimension that is less than a width direction dimension of the primary weight plate part, and wherein a curvature radius of a rear surface side of the primary weight plate part is greater than a radius of the outer shaft, and the center of the curvature radius of the rear surface side of the primary weight plate part coincides with the center of a radius of the outer shaft in a state where the balance weight is disposed on the outer peripheral side face of the outer shaft.

8. An unbalance correction device of a propeller shaft, comprising:

a propeller shaft comprising a plurality of annular dampers each comprising elastic members mounted along an axial direction between a metallic outer shaft and a metallic inner shaft; and a balance weight comprising a primary weight plate part and an auxiliary weight plate part that are formed in an arc shape along a width direction and comprising a substantially quadrilateral planar shape that are formed continuously and integrally along a longitudinal direction, and a protruding piece is protrusively formed on a concave arced surface on a rear surface side of the primary weight plate part and from each corner part at four locations, wherein the primary weight plate part is disposed in a non-mounted area of the plurality of annular dampers at an axial direction end of the outer shaft with a longitudinal direction of the balance weight coinciding with an axial direction of the outer shaft, and the balance weight is configured such that only the protruding piece comes in contact with and is welded to an outer peripheral side face of the outer shaft, wherein the auxiliary weight plate part is formed such that a wall thickness thereof gradually becomes thinner as the auxiliary weight plate part becomes separated from an end of the primary weight plate part, and wherein a curvature radius of a rear surface side of the primary weight plate part is greater than a radius of the outer shaft, and a center of the curvature radius of the rear surface side of the primary weight plate part coincides with a center of a radius of the outer shaft in a state where the balance weight is disposed on the outer peripheral side face of the outer shaft.

9. The unbalance correction device of a propeller shaft according to claim 2, wherein a shape of a contact surface with the outer peripheral side face of the outer shaft in the protruding piece comprises a triangular shape.

10. An unbalance correction device of a propeller shaft, comprising:

a propeller shaft comprising a plurality of annular dampers each comprising elastic members mounted along an axial direction between a metallic outer shaft and a metallic inner shaft; and a balance weight comprising a primary weight plate part and an auxiliary weight plate part that are formed in an arc shape along a width direction and comprising a substantially quadrilateral planar shape that are formed continuously and integrally along a longitudinal direction, and a protruding piece is protrusively formed on a concave arced surface on a rear surface side of the primary weight plate part and from each corner part at four locations, wherein the primary weight plate part is disposed in a non-mounted area of the plurality of annular dampers at an axial direction end of the outer shaft with a longitudinal direction of the balance weight coinciding with an axial direction of the outer shaft, and the balance weight is configured such that only the protruding piece comes in contact with and is welded to an outer peripheral side face of the outer shaft, wherein a curvature radius of a rear surface side of the primary weight plate part is greater than a radius of the outer shaft, and a center of the curvature radius of the rear surface side of the primary weight plate part coincides with a center of a radius of the outer shaft in a state where the balance weight is disposed on the outer peripheral side face of the outer shaft, and wherein a shape of a contact surface with the outer peripheral side face of the outer shaft in the protruding piece comprises a triangular shape.

* * * * *